United States Patent [19]

Marsden et al.

[11] Patent Number: 4,869,959
[45] Date of Patent: Sep. 26, 1989

[54] ELECTRICALLY INSULATED WIRE

[75] Inventors: Eric P. Marsden; John A. Checkland, both of Pointe Claire, Canada

[73] Assignee: Northern Telecom Limited, Ottawa, Canada

[21] Appl. No.: 263,610

[22] Filed: May 14, 1981

Related U.S. Application Data

[63] Continuation of Ser. No. 150,590, Dec. 20, 1979, abandoned, which is a continuation-in-part of Ser. No. 910,644, May 30, 1978, abandoned.

[51] Int. Cl.$^4$ .............................................. B32B 27/00
[52] U.S. Cl. ............................ 428/383; 174/120 SR; 428/380
[58] Field of Search ............... 428/379, 380, 383, 375, 428/401; 174/110 U, 120 SR, 110 PM, 110 SR

[56] References Cited

U.S. PATENT DOCUMENTS

| | | |
|---|---|---|
| 3,406,045 | 10/1968 | Sattler . |
| 3,623,940 | 11/1971 | Gladstone ........................ 174/110 U |
| 3,840,694 | 10/1974 | Luczak . |
| 3,843,402 | 10/1974 | Albarino et al. .................... 428/379 |
| 3,928,210 | 12/1975 | Peterson ............................. 428/383 |
| 4,008,368 | 2/1977 | Leuchs .......................... 174/120 SR |
| 4,062,998 | 12/1977 | Hagiwara et al. .................. 428/380 |
| 4,101,699 | 7/1978 | Stine et al. . |

FOREIGN PATENT DOCUMENTS

| | | | |
|---|---|---|---|
| 461101 | 2/1937 | United Kingdom ......... | 174/120 SR |
| 1046756 | 11/1964 | United Kingdom . | |

Primary Examiner—Lorraine T. Kendell
Attorney, Agent, or Firm—Foley & Lardner, Schwartz, Jeffery, Schwaab, Mack, Blumenthal & Evans

[57] ABSTRACT

Electrically insulated wire with an inner layer of non-crosslinked and non-crosslinkable polymeric material and a skin layer of irradiation crosslinked material compatible with the inner layer. The inner layer provides desirable flexibility and electrical insulating properties suitable for telecommunications cable and appliance wiring. The skin layer gives abrasion resistance suitable for the above purpose and heat resistance and fire retardance properties suitable for building wiring. The polymeric material of both layers is preferably of a polyvinylchloride composition.

2 Claims, 1 Drawing Sheet

ELECTRICALLY INSULATED WIRE

This is a continuation of application Ser. No. 105,596 filed Dec. 20, 1979, now abandoned, which was a continuation-in-part of application Ser. No. 910,644 filed May 30, 1978, now abandoned.

This invention relates to electrically insulated wire.

Problems exist in the use of electrically insulated wires having electrical conductors with a maximum size possibly around 19 gauge but normally in the region of 22 to 26 gauge. For instance, in telecommunications cable, the insulated wires essentially are flexible to enable them to be bent into tortuous paths for instance in switchboard or main frame installations. Many cables are used in such installations and they must remain flexible to enable them to be flexed into different positions during changing of other cables during repair or maintenance procedures. Electrical wires to be used for connecting within and hooking up electrical appliances need to be flexible for similar reasons. A problem which exists with electrically insulated wires in which flexibility to this degree is provided, is that the wires are lacking in abrasion resistance when brought into contact with or are drawn along frame members.

Further, where wires are to be soldered together or to terminals, the insulation is crosslinked to give it the short term heat resistance required when being touched momentarily by a hot soldering iron. While crosslinking also makes the insulation abrasion resistant, it detracts from its electrical insulating properties and increases its rigidity to render it too inflexible to be used without difficulty in small spaced where bending of the wire is required.

Small gauge electrically insulated wiring is also used for house and other building wiring. Such wiring requires that the finished cable containing such wiring should pass current overload and fire resistance tests. Polyvinylchloride insulation will soften and flow in overload tests in which temperatures at the insulation surface reach 200° C. These may lead to exposure of conductors. Hence, as an alternative insulating material for building wire, 612 nylon is being used. This has certain disadvantages. For instance, nylons absorb water which, if it is converted to steam during extrusion of insulating layers, causes pinholes in the insulation. Nylon is also expensive and extremely flammable. The use of nylon also makes it difficult to use fastening push clips to attach wires to supporting surfaces as the hardness of the nylon resists surface piercing by the clips during attachment. There is also the problem that the nylon tends to separate from any material lying beneath it when it is subjected to compression as during attachment of push clips or even bending of wires along their desired paths.

The present invention provides an electrically insulated wire which has the required flexibility to enable it to be used as telecommunications cable and for electrical appliances. While retaining its insulating properties, the insulation also has improved abrasion resistance and short term high temperature resistance. These latter properties also render the flexible wire suitable for building wiring and where soldering is required.

According to the present invention, an electrically insulated wire is provided comprising a conductor covered by two layers of insulation, said two layers consisting of an inner layer of non-crosslinked and non-crosslinkable polymeric material and an irradiated crosslinked polymeric skin layer compatible with the inner layer and surrounding the inner layer.

In the above defined wire according to the invention, the desired flexibility and electrical insulating characteristics are provided by the inner non-crosslinked layer while the abrasion resistance and short term heat resistance is afforded by the skin layer. The materials of the two layers are a matter of choice and depend upon particular requirements. For instance, the inner layer may be chosen from materials including polyvinylchloride, polyolefins and polyethylene. In a preferred construction, the layers are made from a compound incorporating polyvinylchloride.

The invention also includes a method of making an electrically insulated wire in which a conductor covered with an inner layer of non-crosslinkable and non-crosslinked polymeric material is fed through an extruder to form a skin layer of crosslinkable polymeric material, compatible with the inner layer, around the inner layer, and the skin layer is then irradiated to crosslink it.

Embodiments of the invention will now be described, by way of example, with reference to the accompanying drawings, in which.

Figure 1:
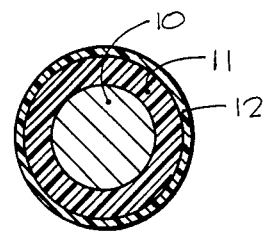
FIG. 1 is a cross-section through an electrically insulated wire.

In a first embodiment, an electrically insulated wire, as illustrated in FIG. 1, comprises a copper electrical conductor 10, having formed thereon an inner insulation layer 11 of a non-crosslinked and non-crosslinkable polyvinylchloride composition, and an irradiation crosslinked polyvinylchloride composition skin layer 12.

The two polyvinylchloride compositions are essentially the same but for the skin layer, methacrylate and acrylate monomers are incorporated into the composition at the dry blending stage. By subsequently exposing the insulation coated wire to an electron beam radiation, the skin layer is crosslinked.

The above described wire is useful for a variety of purposes. For instance, it may be used as a wire in a cable pair in telecommunications cable. The inner layer 11 of insulation, of non-crosslinked polyvinylchloride is extremely flexible and may enable the wire to be bent without difficulty for main frame wiring or switchboard installations. Also, because of the lack of curing action, the electrical insulating properties of the polyvinylchloride are retained. The thickness of the layer 11 is, in fact, consistent with providing the required electrical insulating properties and for a conductor thickness from 19–26 gauge, the inner layer 11 may be around 0.010 inches thick. For the above reasons, the wire is also useful for electrical appliance wiring.

The outer or skin layer, because it is crosslinked, becomes harder to provide abrasion resistant properties useful for all applications and also has flame retardant and heat resistance properties. Thus, the skin layer protects the inner layer and makes the wire useful where conductor soldering is required as the skin layer will resist short term high temperature treatment by momentarily being touched by a hot soldering iron. while crosslinking of the skin layer detracts from its electrical insulation properties, this is unimportant, as these properties are provided by the inner layer 11.

The wire is also useful for building wire and is capable of withstanding the standard electrical overload tests and the skin layer makes it fire retardant. While the overload tests could tend to soften the material of layer 11, the skinlayer 12 remains unaffected by the heat thereby preventing softened material of layer 11 from flowing away to expose the conductor. The flexibility of the wire also is of assistance for use as building wire because it is easier to position than conventional building wire.

Further, because of the layer 11 being noncrosslinked, it is softer than the skin layer. Hence, it is a relatively simple operation to apply push clips against the wire to hold it to supporting structure as the skin layer is deformable by plastic displacement of the inner layer by a compressive force applied by the clips. Separation between the layers does not take place during this deformation as the materials of the layers are compatible.

The wire remains flexible down to quite low temperatures, for example down to −30° C. It therefore satisfactorily replaces present nylon insulated building wires while being cheaper and avoiding the flammability and tendency for having pinholes of nylon.

The thickness of the skin layer should be chosen to provide sufficient abrasion, heat resistance and fire retardance properties while not detracting unduly from the flexibility characteristics of the wire. Thus, the skin layer should be as thin as possible while providing the required properties to the wire. Hence, in a wire with conductor up to 19 gauge thickness and an inner layer of around 0.010 inches thickness, the skin layer may have a thickness of around 0.003 inches.

Four compounds suitable for the skin layer 12 with varying qualities of heat resistant and good flame retardation are:

|  | phr 1 | phr 2 | phr 3 | phr 4 |
|---|---|---|---|---|
| Polyvinylchloride (Kvalue 65) | 100 | 100 | 100 | 100 |
| TEGDM | 5 | 5 | 5 | 10 |
| TMPTM | 15 | 15 | 15 | 10 |
| TOTM | 40 | 20 | 40 | 40 |
| Tribase (stabilizer) | 7 | 7 | — | 7 |
| Santonox R | 0.15 | 0.15 | 0.15 | 0.15 |
| Mark 1900 | — | — | 1.5 | — |

TEGDM = Difunctional methacrylate monomer
TMPTM — Trifunctional methacrylate monomer
TOTM = Trioctyl Trimaletate — plasticizer
Mark 1900 = Methyltin stabilizer.

Figure 2:
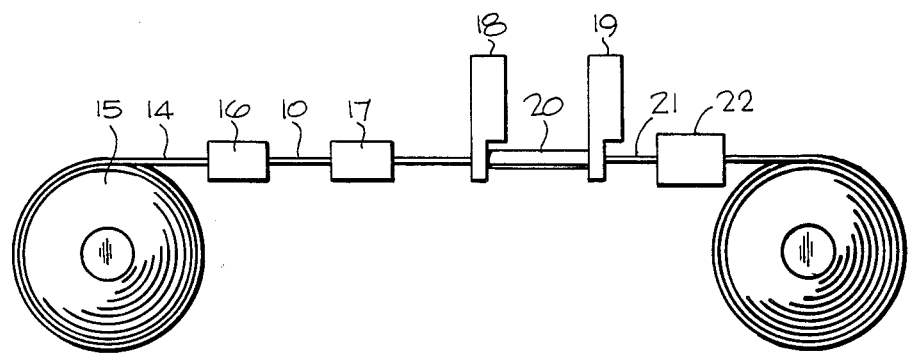
FIG. 2 is a diagrammatic illustration of a means for producing the wire of FIG. 1.

FIG. 2 illustrates diagrammatically a process for the production of the wire of FIG. 1. The conductor, for example a copper wire 14, is fed off a reel 15. The wire 14 is often of a diameter larger than the desired diameter of the conductor and in this case is fed through a drawing machine 16 which reduces the wire size to form the conductor 10. The conductor is then fed through an annealing furnace 17 and then through two extruders 18, 19 in tandem where the polyvinylchloride inner PVC layer 11 is applied in extruder 18 and the polyvinylchloride crosslinkable layer 12 is applied in extruder 19. A transfer tube 20 connects the extruders 18 and 19 and initially this may be heated, but this is not necessary after the process has run for a short time. The transfer tube maintains the first layer of insulation at a temperature which assists in the second layer bonding to the first layer. From the extruder 19 the coated conductor passes through a cooling region 21 and then through an irradiation apparatus 22.

Irradiation causes crosslinking in the skin of the insulation for the whole or part of its depth to produce the skin thickness required.

In a second embodiment, a wire is of similar cross-section to that shown in FIG. 1 and is produced by the process described for the first embodiment. The electrically insulated wire of the second embodiment is different, however, in that its inner layer 11 is formed of a non-crosslinked and non-crosslinkable polyethylene composition and the skin layer is formed of a crosslinked polyethylene composition.

What is claimed is:

1. An electrically insulated wire comprising a conductor of from 19 to 26 gauge covered by two layers of insulation, said two layers comprising an inner layer of noncross-linked and noncross-linkable polymeric material and an irradiated cross-linked outer layer compatible with the inner layer and surrounding the inner layer, the inner layer being softer and thicker than the outer layer and the outer layer being deformable by plastic displacement of the inner layer under a compressive force,
   wherein the inner layer is noncross-linked polyvinyl chloride composition and the outer layer is a radiation cross-linked polyvinyl chloride composition.

2. A compositely insulated wire, comprising:
   a conductor;
   a first layer of plastic material covering said conductor, said first layer of plastic material comprising a noncross-linkable plasticized polyvinyl chloride composition; and
   a second layer of plastic material comprising an irradiation cross-linked, plasticized polyvinyl chloride composition having a thickness that is substantially less than that of the first layer, said second layer being adhered to the first layer.

* * * * *